(12) United States Patent
Tamborini et al.

(10) Patent No.: US 9,321,253 B2
(45) Date of Patent: Apr. 26, 2016

(54) ROLL DEVICE

(75) Inventors: Dario Tamborini, Varese (IT); Osvaldo Novello, Loano (IT)

(73) Assignee: AUTOMATIC LAMINATION TECHNOLOGIES S.R.L., Milan (IT)

( * ) Notice: Subject to any disclaimer, the term of this patent is extended or adjusted under 35 U.S.C. 154(b) by 0 days.

(21) Appl. No.: 14/361,408

(22) PCT Filed: Nov. 30, 2011

(86) PCT No.: PCT/IT2011/000394
§ 371 (c)(1),
(2), (4) Date: May 29, 2014

(87) PCT Pub. No.: WO2013/080232
PCT Pub. Date: Jun. 6, 2013

(65) Prior Publication Data
US 2014/0326415 A1    Nov. 6, 2014

(51) Int. Cl.
B32B 37/00    (2006.01)
B32B 37/06    (2006.01)
H05B 3/00    (2006.01)
B32B 37/10    (2006.01)

(52) U.S. Cl.
CPC ............. B32B 37/06 (2013.01); B32B 37/0053 (2013.01); B32B 37/10 (2013.01); H05B 3/0095 (2013.01)

(58) Field of Classification Search
CPC .... B32B 37/0053; B32B 37/10; B32B 37/06; H05B 3/0095
USPC ........................ 156/555, 580, 581, 582, 583.1
See application file for complete search history.

(56) References Cited

U.S. PATENT DOCUMENTS

| | | | |
|---|---|---|---|
| 6,628,917 | B2 | 9/2003 | Lee |
| 6,898,390 | B2 | 5/2005 | Lee et al. |
| 7,164,880 | B2 * | 1/2007 | Kim et al. ............ 399/330 |
| 7,369,805 | B2 * | 5/2008 | Kim et al. ............ 399/330 |
| 2002/0176720 | A1 | 11/2002 | Lee et al. |
| 2003/0044204 | A1 | 3/2003 | Lee |

FOREIGN PATENT DOCUMENTS

DE    202 00 895    4/2002
EP    1 260 881    11/2002

(Continued)

OTHER PUBLICATIONS

International Search Report dated Sep. 9, 2012, corresponding to PCT/IT2011/000394.

(Continued)

*Primary Examiner* — James Sells
(74) *Attorney, Agent, or Firm* — Young & Thompson

(57) ABSTRACT

The invention relates to a roll device (300) that comprises: a roll (100) removably connectable to a support structure (200); —a heating element (7) seated within the roll (100); an electrical connector for supplying the heating element (7). The roll device is characterized in that the connector comprises: —a first contact (12) arranged in a bottom wall (8) of the roll (100); —a second contact (13) arranged in the support structure (200) and adapted for engaging the first contact (12) in pressing contact, wherein one between the first (12) and the second (13) contact is movable between a retracted position and a position extended towards the other contact and permanently stressed in the extended position.

11 Claims, 5 Drawing Sheets

(56) References Cited

FOREIGN PATENT DOCUMENTS

| | | |
|---|---|---|
| JP | H08-101597 | 4/1996 |
| JP | H10-241832 | 9/1998 |
| JP | H10-312128 | 11/1998 |
| JP | H11-30922 | 2/1999 |
| JP | 2000-147932 | 5/2000 |
| JP | 2001-148278 | 5/2001 |
| JP | 2002-351256 | 12/2002 |
| JP | 2003-162170 | 6/2003 |

OTHER PUBLICATIONS

JP Office Action, dated Oct. 6, 2015; Application No. 2014-544051.

\* cited by examiner

ROLL DEVICE

FIELD OF THE INVENTION

The present invention relates to a roll device, usable in particular but non-limitedly, in a machine for laminating panels forming a substrate of printed circuits.

DESCRIPTION OF THE PRIOR ART

As known, laminating machines are used for manufacturing printed circuits, for applying a dry film of photosensitive material or photoresist to panels adapted for forming a substrate for said printed circuits.

Such laminating machines comprise laminating rolls, generally two rolls, opposite to each other along a direction substantially orthogonal to the panel processing direction. Such laminating rolls are configured for rotating in an opposite direction relative to each other for applying the dry film to the panels and, at the same time, aid the advance of the same panels towards an outlet of the laminating machine.

As is known by a man skilled in the art, in order to apply such film to the panels it is necessary for the outer cylindrical surface of the laminating rolls to be suitably heated. In general, some techniques have been developed and some devices are known which, according to the type of process to be carried out on the panels, allow heating the outer roll surface to make such surface take a temperature comprised within a range, for example, between 90° C. and 130° C.

A known technique provides for the use of an infrared lamp adapted for heating the outer roll surface by irradiation, during the rotation of the same.

However, such heating technique exhibits the drawback of not allowing an even heat distribution on the cylindrical roll surface so that different temperatures, even by about 10° C., are found on different surface portions of a roll. The presence of temperature is gradients on the outer roll surface degrades the lamination operation.

In order to ensure a more uniform heating of the outer roll surface, another known heating technique provides for the use of electrical heating means seated within the same rolls. Such means are, for example, an electrical resistor seated in a suitable cavity of the roll and connected to an electrical power source external to the roll by a rotating collector or slip ring.

Heating by the Joule effect, such resistor transmits heat from the roll interior towards the outer cylindrical surface of the same, bringing the surface to the desired temperature.

However, the laminating machines using the electrically heated rolls described above exhibit some drawbacks.

In particular, during maintenance operations on the laminating machine to carry out the replacement of one of such worn rolls, an electrician's service is required who initially disconnects the connectors of the heating electrical resistor from the rotating collector. Thereafter, the resistor is removed, extracting it from the roll. Only at that point, an operator in charge of the machine maintenance can manually disengage the roll to be replaced from support elements arranged in the machine and the roll is removed. Likewise, in order to connect the new roll to the laminating machine, at first the operator attaches such roll to support elements of the laminating machine. Thereafter, the electrician inserts the heating electrical resistor into the new roll, restoring the electrical connections of such resistor with the rotating collector.

It should be noted that besides being not very easy, said operations for replacing the rolls heated by the laminating machine may cause long interruptions in the machine operation to be completed. In fact, for safety reasons, such replacement operations always require an electrician's service in addition to the operator in charge of maintenance of the laminating machine. As a consequence, this may cause long interruptions in the operations of an entire panel processing line.

SUMMARY OF THE INVENTION

The object of the present invention is to devise and provide a roll device, particularly of the type comprising an electrically heated roll, which allows at least partially obviating the drawbacks mentioned above with reference to the solutions of laminating machines with heated rolls of the prior art.

BRIEF DESCRIPTION OF THE DRAWINGS

Further features and advantages of the roll device according to the invention will appear more clearly from the following description of preferred embodiments thereof, given by way of a non-limiting example with reference to the annexed figures, wherein.

DETAILED DESCRIPTION

Figure 8:
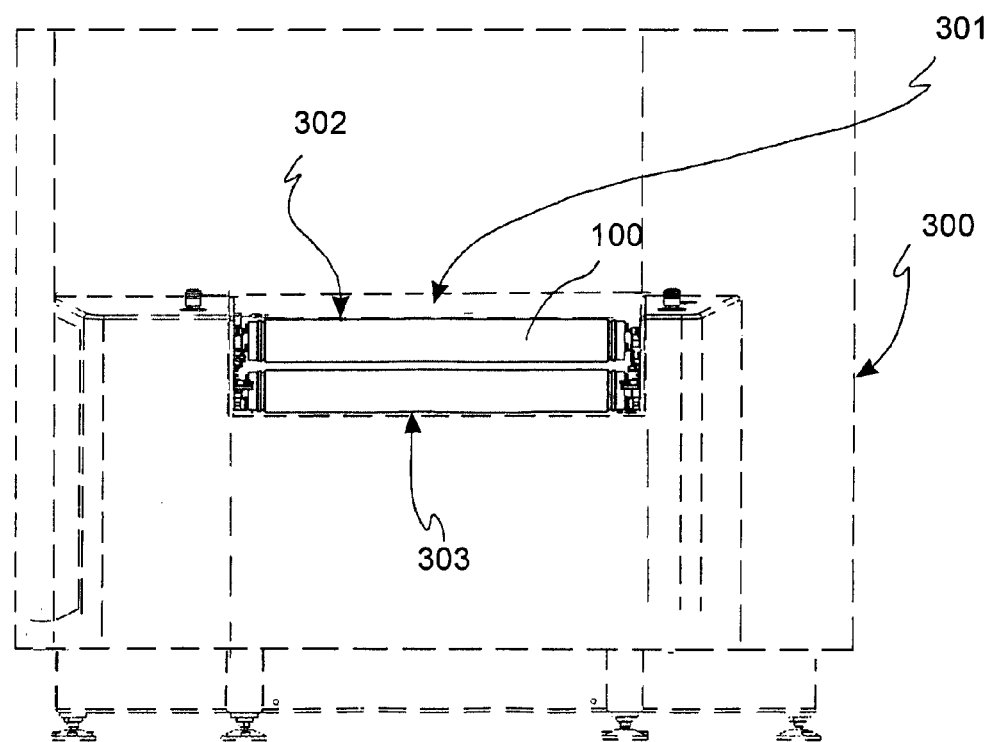
FIG. 8 shows a schematic front view of a roll device according to the present invention.

With reference to the above FIG. 8, a roll device according to an example of the invention is globally indicated with reference numeral 300. Such roll device 300 may be used, for example, for laminating panels adapted for forming a substrate of printed circuits, that is, for applying an adhesive dry film of photosensitive material onto such panels. It should be noted that the above FIG. 8 shows in detail, with solid line, a main portion 301 of the roll device 300 comprising a laminating unit. Secondary portions of the roll device 300 of the invention are schematically shown with dashed lines.

Such laminating unit 301 comprises, in particular, a first 302 and a second 303 laminating group of the roll device 300 opposite to each other along a direction substantially orthogonal to the advance direction of the panels to be laminated.

Figure 5:
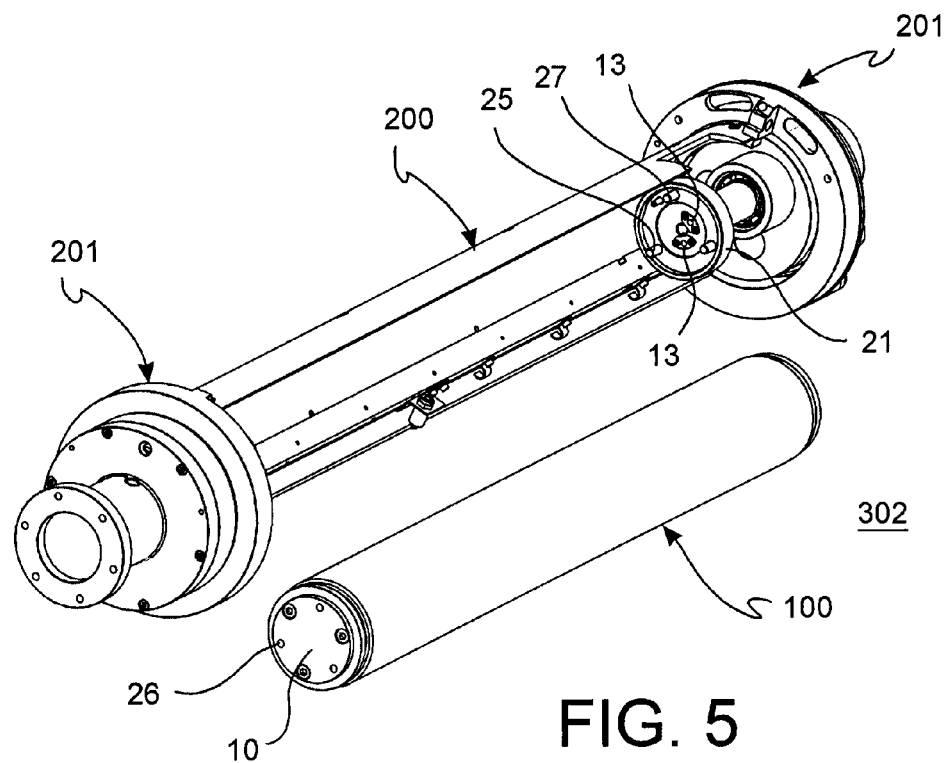
FIGS. 5 and 6 show perspective views from the left and from the right, respectively, of a portion of the device roll of the invention wherein the roll of FIG. 2 is released from a support structure of the roll.
Figure 6:
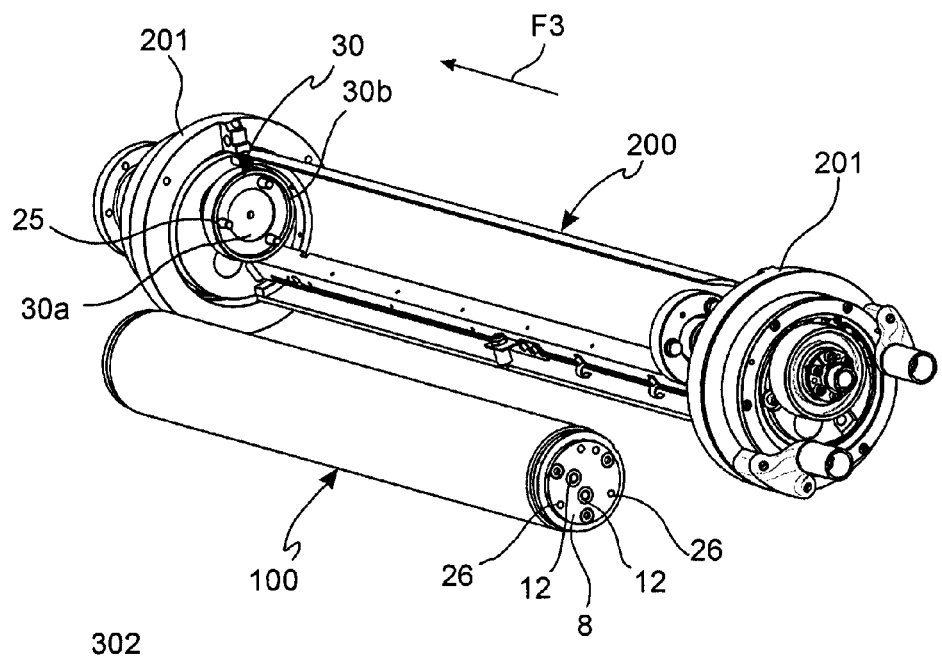

With reference to FIGS. 5 and 6, the first laminating group 302 of the roll device 300 of the invention is shown in two enlarged perspective views. In more detail, such first laminating group 302 comprises a roll 100 removably connectable to a support structure 200. It should be noted that the above FIGS. 5 and 6 show the roll 100 released from the support structure 200. Moreover, end portions 201 of the support structure 200 are enclosed by a casing of the roll device 300 and therefore, they are not visible in FIG. 8.

With reference to FIGS. 1, 2, 3, 4A, 4B, a preferred exemplary embodiment of roll 100 of the roll device 300 of the invention is described hereinafter.

It should be noted that in the above figures, elements which are equivalent or similar are indicated by the same reference numerals.

Such roll 100 comprises a tubular body configured for delimiting a cavity 3 that extends in the direction of a longitudinal axis of such tubular body 1 between a first 4 and a second end 5 of roll 100. In particular, such tubular body 1 comprises a roll core 2 that extends in a radial direction from said cavity 3 to an outer cylindrical surface or shell 2a of roll 100. Such core 2 of roll 100 is made of a metal material, for example aluminium. The shell 2 is for example made of rubber.

Roll 100 comprises a heating element 7 seated within cavity 3. Such heating element is an electrical resistor 7 insertable/removable into/from such cavity 3 through an access opening 6 to the same cavity 3 provided at least one of said first 4 and second 5 end of roll 100. With reference to the example of FIG. 1, such access opening 6 to cavity 3 is placed at the first end 4 of roll 100. Moreover, such access opening 6 may be closed again by a first bottom wall 8 of roll 100 releasably fixable to said first end 4 by screws 9, for example three screws, adapted for engaging respective holes 9a obtained in core 2 of the roll at said first end 4 of the roll 100.

Moreover, it should be noted that roll 100 comprises a second bottom wall 10 substantially parallel to said first removable wall 8. Preferably, such second wall 10 is permanently attached to the second end 5 of roll 100 by further screws 11, for example three screws, adapted for engaging respective holes (not shown in the figures) obtained in said second end 5.

It should be noted that the roll device 300 of the invention, and in particular the first laminating group 302 of FIGS. 5 and 6, comprises an electrical connector for supplying the electrical resistor 7 adapted for connecting such resistor 7 to an electrical power source external to such first laminating group 302. For example, such electrical connector is configured for connecting resistor 7 to such power source by a rotating collector or slip ring (not shown in the figures). Such rotating collector is known to a man skilled in the art. Heating by the Joule effect, said resistor 7 is adapted for transmitting the generated heat to the core 2 up to shell 2a of roll 100.

Figure 7:
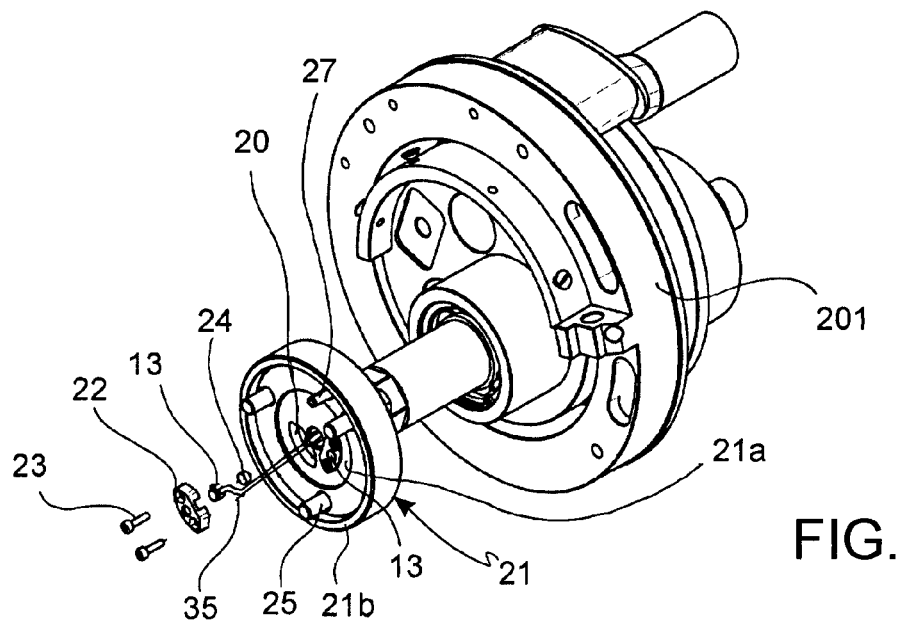
FIG. 7 shows a perspective enlarged and partially exploded view of a portion of the support structure of the roll of FIG. 5.

In a preferred embodiment, said electrical connector comprises a first contact 12 arranged within the first bottom wall 8 of roll 100. With reference to FIGS. 5 and 7, it should be noted that the support structure 200 comprises a respective second contact 13 adapted for engaging the first contact 12 in pressing contact.

Advantageously, one between such first 12 and second 13 contact is movable between a retracted position and a position extended towards the other contact and permanently stressed in the extended position.

Figure 4A:
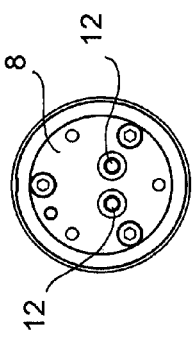
FIGS. 4A-4B show views of the roll of FIG. 2 along the directions indicated by arrows F1 and F2, respectively.
Figure 4B:
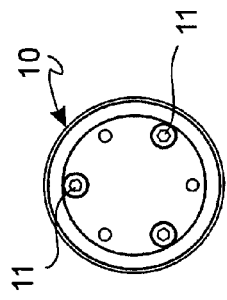

In more detail, with reference to FIGS. 4A and 6, said first contact of roll 100 comprises two first electrical contacts 12, made of a metal material, for example copper. Each of such first contacts 12 is movable in a respective through seat 14 (shown in FIG. 1) of the first bottom wall 8 of roll 100. For simplicity, FIGS. 1 and 2 only show one of said first contacts 12 in detail.

Figure 1:
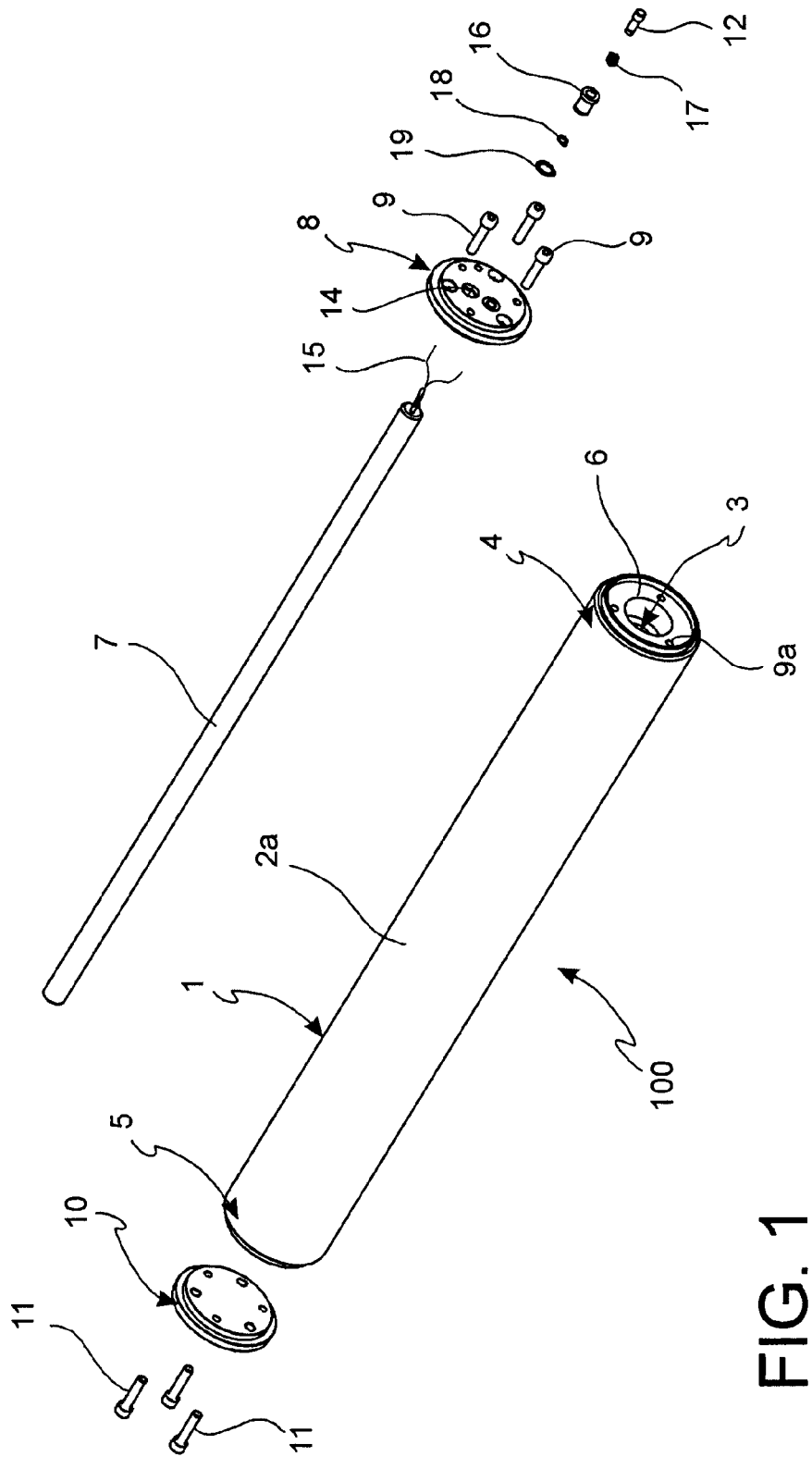
FIG. 1 shows a perspective and exploded view of a roll of the roll device according to a preferred exemplary embodiment of the invention.
Figure 2:
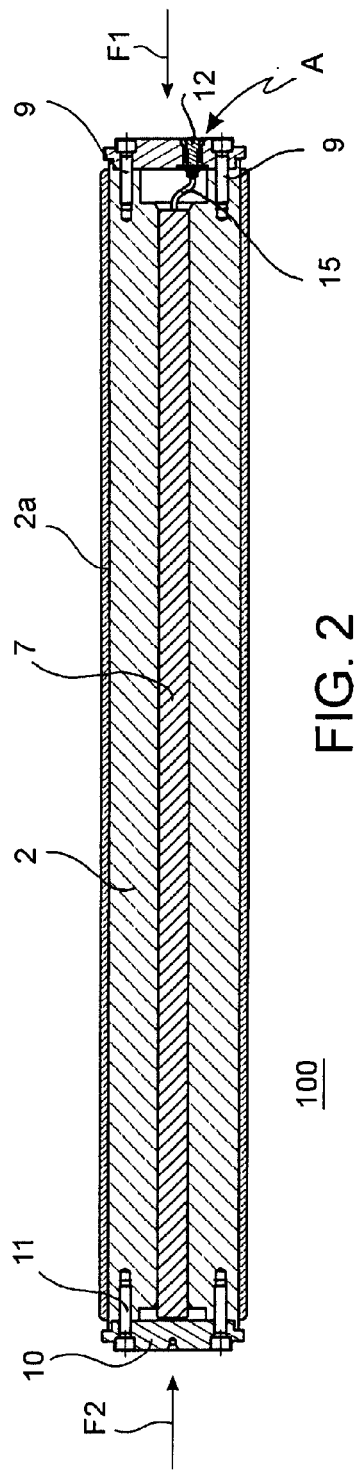
FIG. 2 shows a side and cutaway view of the roll of FIG. 1 in assembled configuration.
Figure 3:
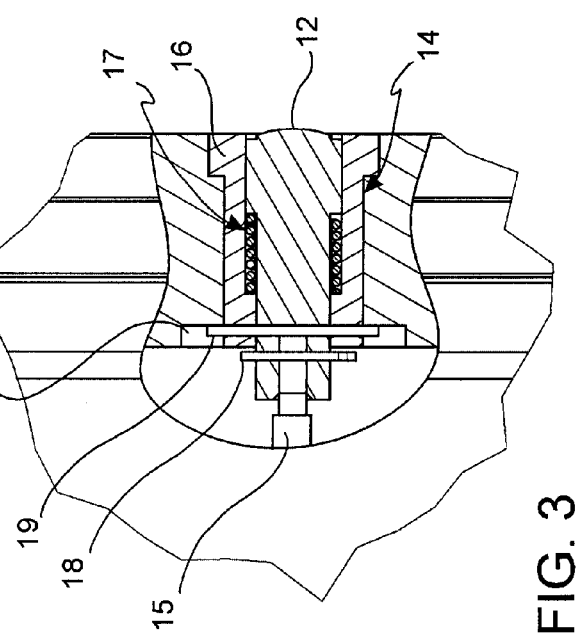
FIG. 3 shows a cutaway and enlarged view of an end portion of the roll of FIG. 2.

With reference to FIG. 3, which shows an enlargement of a portion A of roll 100 of FIG. 2, each of such first contacts 12 is elastically shifting within the first through seat 14 in the direction of the longitudinal axis of roll 100 between said extended and retracted positions.

In particular, each first contact 12 is fitted within a tubular containment element or bush 16 of insulating material so as to be coaxial with the latter within seat 14. In particular, said bush 16 is configured for engaging with the first bottom wall 8 of roll 100 by a first stop ring 19 attached to an outer surface of bush 16 being integral with the same bush. Such first stop ring forms a respective collar for bush 16. As shown in FIG. 3, such first stop ring 19 is adapted for engaging a respective annular recess 19' of seat 14 for locking bush 16 seated within the same seat 14. A compression spring 17 is interposed between the first contact 12 and bush 16 which permanently stresses the first contact 12 in the extended position, that is, away from said first stop ring 19.

The first contact 12 is connected to one of cables 15 of the electrical resistor 7 at a second stop ring 18. Such second stop ring 18 is integrally attached to the first contact 12 and is adapted for forming an abutment wall for limiting the axial shifting of contact 12. Such second stop ring 18 forms a respective collar for the first contact 12. In particular, in rest position, such second ring 18 interferes with bush 16 for preventing the first contact 12 from being ejected from roll 100 under the action of spring 17.

With reference to FIGS. 5, 6 and 7, the second contact of the support structure 200 comprises two second contacts 13. Each of said second contacts 13 is seated within a respective seat 20 obtained within a first support element 21 of the support structure 200. Such first support element 21 is configured for cooperating with an opposite second support element 30 for attaching the roll 100 to the support structure 200.

Such first support element 21 is of a metal material, for example steel, and comprises a first pin 21a irremovably attached at one of the end portions 201 to the support structure 200 and a first fixing ring 21b coaxial to the first pin 21a and axially shifting relative thereto.

With reference to FIG. 7, each of such second contacts 13 is fitted within a contact-holder base 22 of insulating material, for example arnite, seated within the respective seat 20 and constrained to the first pin 21a by screws 23, for example two screws.

Figure 9:
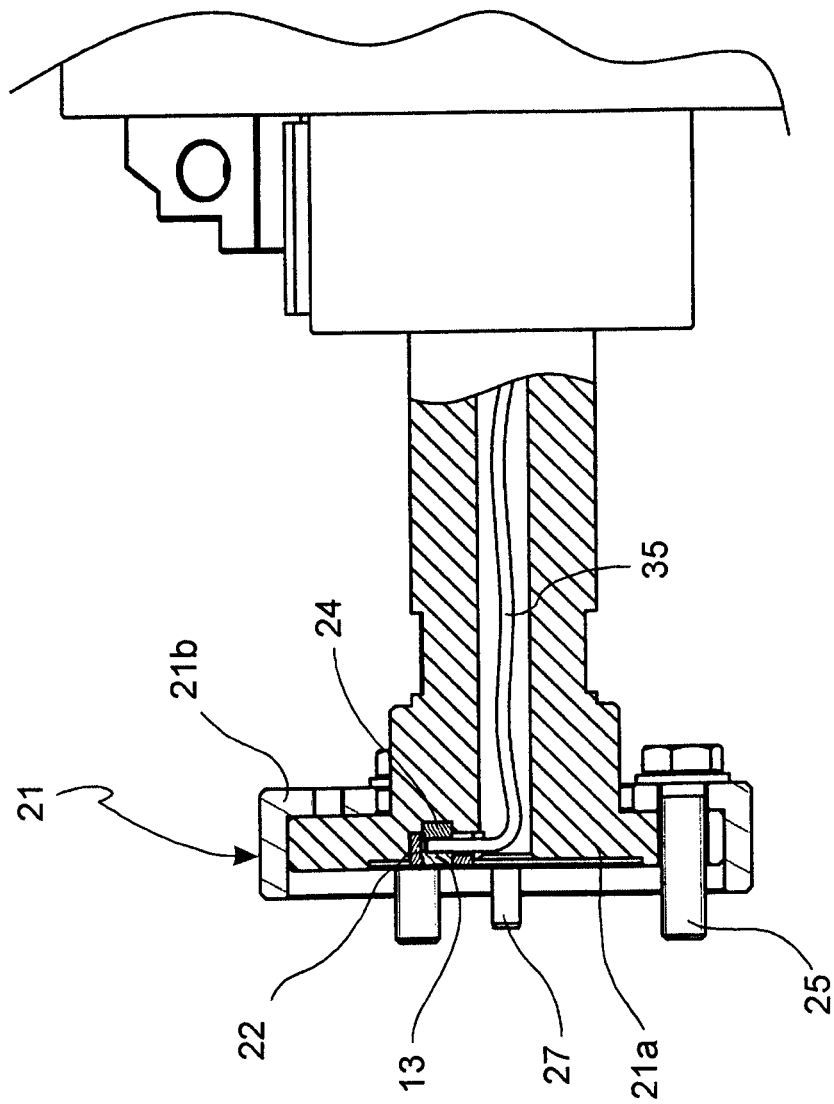
FIG. 9 shows a cutaway view of the portion of support structure of the roll of FIG. 7.

Moreover, with reference to FIGS. 7 and 9, for each of the second contacts 13, the first support element 21 comprises a shock-absorbing element or pad 24 of insulating material seated within the respective seat 20 so as to be interposed between the second contact 13 and an inner wall of the first pin 21a. Such pad 24 is configured for electrically insulating each second contact 13 from the first pin 21a. Moreover, always with reference to FIGS. 7 and 9, each second contact 13 is connected to the outer rotating collector by a respective electrical cable 35.

With reference to FIG. 6, it should be noted that, as mentioned above, the support structure 200 comprises the second support element 30 of the roll 100 arranged in distal position from the first support element 21 and substantially coaxial with the latter. In particular, the second support element 30 comprises a second pin 30a irremovably attached to the support structure 200 and a respective second fixing ring 30b shifting relative to such second pin 30a.

It should be noted that such first 21b and second 30b fixing rings are configured for attaching the roll 100 to the support structure 200.

In more detail, always with reference to FIG. 6, such first and second fixing rings 21b, 30b are configured for reversibly shifting in reciprocal approach and moving away in the direction of arrow F3 during the attachment and removal steps of roll 100 to/from the same support structure 200.

In particular, for attaching the roll 100, the first 21b and the second 30b fixing ring are adapted for engaging, respectively, with the first 8 and the second 10 bottom wall of roll 100 by fixing screws 25. In the example of FIGS. 5, 6 and 7, such fixing rings 21*b* and 30*b* comprise each three fixing screws 25 adapted for being seated in as many holes 26 arranged on the first 8 and on the second 10 bottom wall of roll 100.

In addition, with reference to FIG. 7, it should be noted that the first fixing ring 21*b* comprises a respective centring pin 27 adapted for ensuring a correct fixing orientation of roll 100, that is, for ensuring that the first contacts 12 of roll 100 electrically engage with the second contacts 13 of the first pin 21*a* when the roll 100 is attached to the support structure of device 300.

The roll device 300 of the present invention comprising the laminating group 302 described above exhibits several advantages with particular reference to operations for replacing the heated roll 100 subsequent to wear of the same.

In particular, for replacing such roll 100, an operator in charge of maintenance at first removes screws 25 attaching the first 21*b* and the second 30*b* shifting fixing ring of the support structure 200 from the first 8 and the second 10 bottom wall of roll 100, respectively.

Thereafter, the operator shifts the first 21*b* and the second 30*b* fixing ring in the direction of the longitudinal axis of roll 100 away from each other for releasing the same roll 100 from the support structure 200.

Likewise, in order to attach a new roll 100 having a structure similar to that replaced to the roll device 300, once the correct orientation of such roll 100 has been determined through pin 27, the operator shifts the first 21*b* and the second 30*b* fixing ring in the direction of the longitudinal axis of roll 100, in approach to each other, for engaging such rings 21*b*, 30*b* with the bottom walls 8, 10 of roll 100.

At this point, the operator stiffly attaches roll 100 to rings 21*b*, 30*b*, that is, to the support structure 200, screwing the fixing screws 25.

In the light of the above, with the roll device of the present invention, replacing a roll 100 does not require the service of an electrician since it is not necessary to disconnect and connect the connectors of the heating resistor 7 seated within roll 100 from the rotating collector.

With the present invention it is not even necessary to extract/reinsert the electrical resistor 7 from/into roll 100 during the roll replacement steps. In other words, the operations for replacing the worn roll 100 may be safely carried out by the same operator of device 300.

Moreover, the operation for replacing roll 100 is easy and requires little time to be completed. In this way, interruptions in the operation of device 300 and of the relative panel processing line are prevented.

Moreover, the roll device 300 of the present invention allows preventing a drawback found in the laminating machines of the known type using heated rolls. In fact, the Applicant has found that in such machines, subsequent to a failure of the heating resistor, such resistor may undergo an excessive expansion remaining locked within the roll without the possibility of being extracted to be replaced. Since in such machines, the roll cannot be removed from the same machine either without first extracting the resistor, said drawback blocks the machine operations and may cause long interruptions of the panel processing line.

The roll device 300 of the invention is free from such drawback since the heating resistor 7 is removed at the same time as roll 100 and therefore, it needs not be removed in advance as in the machines of the known type.

A man skilled in the art may make several changes, adjustments and replacements of elements with other functionally equivalent ones to the embodiments of the roll device described above in order to meet incidental needs, without departing from the scope of the following claims. Each of the features described as belonging to a possible embodiment can be obtained independently of the other embodiments described.

The invention claimed is:

1. A roll device comprising:
a roll removably connectable to a support structure;
a heating element seated within said roll;
an electrical connector for supplying said heating element, said connector comprising:
a first contact arranged in a bottom wall of the roll; and
a second contact arranged in the support structure and adapted for engaging the first contact in pressing contact,
one of the first and second contacts being movable between a retracted position and a position extended towards the other contact and permanently stressed in the extended position,
wherein said bottom wall is removably attached to a first end of said roll for allowing/preventing access to an inner cavity of the roll, said heating element comprising an electrical resistor insertable/removable into/from said cavity through an opening closable by said removable bottom wall.

2. The roll device according to claim 1, wherein said first contact is configured for elastically shifting within a through seat of said bottom wall in the direction of a longitudinal axis of the roll between said extended and retracted positions.

3. The roll device according to claim 2, wherein said first contact is fitted within a tubular containment element seated within the through seat.

4. The roll device according to claim 3, further comprising a compression spring interposed between said first contact and the tubular containment element for permanently stressing said first contact in the extended position.

5. The roll device according to claim 3, further comprising a first stop ring adapted for forming a respective first collar integral with said tubular containment element, said first stop ring engaging a respective annular recess of the through seat for locking the tubular containment element within the seat.

6. The roll device according to claim 3, further comprising a second stop ring integrally attached to the first contact for forming a respective second collar for said first contact, said second stop ring interfering with the tubular containment element for limiting the axial shifting of said first contact.

7. The roll device according to claim 1, wherein said second contact is seated in a further seat obtained within a first support element of the support structure, said first support element being configured for cooperating with an opposite second support element for attaching said roll to the support structure.

8. The roll device according to claim 7, wherein said first support element comprises a first pin irremovably attached to the support structure and a first fixing ring coaxial to said first pin and axially shifting relative thereto, said further seat being obtained within said first pin.

9. The roll device according to claim 8, wherein said first support element comprises a contact-holder base seated within said further seat and constrained to the first pin, said second contact being fitted within said contact-holder base.

10. The roll device according to claim 8, wherein said first support element comprises an electrical insulation element seated within said respective seat so as to be interposed between said second contact and an inner wall of the first pin (21*a*).

11. The roll device according to claim 1, wherein said roll comprises a further bottom wall permanently attached to a second end of the roll opposite said first end.

\* \* \* \* \*